United States Patent [19]

Ewen

[11] Patent Number: 5,459,117
[45] Date of Patent: Oct. 17, 1995

[54] DOUBLY-CONFORMATIONALLY LOCKED, STEREORIGID CATALYSTS FOR THE PREPARATION OF TACTIOSPECIFIC POLYMERS

[76] Inventor: John A. Ewen, 1823 Barleton Way, Houston, Tex. 77058

[21] Appl. No.: 113,427

[22] Filed: Aug. 27, 1993

[51] Int. Cl.$^6$ ............................. B01J 31/00; C08F 4/64
[52] U.S. Cl. ..................... 502/117; 502/103; 526/160
[58] Field of Search ............................. 502/103, 117; 526/160

[56] References Cited

U.S. PATENT DOCUMENTS

| | | |
|---|---|---|
| 3,258,455 | 6/1966 | Natta et al. |
| 3,305,538 | 2/1967 | Natta et al. |
| 3,364,190 | 1/1968 | Emkrick |
| 3,893,989 | 7/1975 | Leicht et al. |
| 4,200,171 | 4/1980 | Seymour et al. |
| 4,287,328 | 9/1981 | Kikuta et al. |
| 4,316,966 | 2/1982 | Mineshima et al. |
| 4,530,914 | 7/1985 | Ewen et al. |
| 4,794,096 | 12/1988 | Ewen |
| 4,852,851 | 8/1989 | Webster |
| 4,874,734 | 10/1989 | Kioka et al. ............ 502/103 |
| 4,892,851 | 1/1990 | Ewen et al. |
| 4,935,474 | 6/1990 | Ewen et al. |
| 4,975,403 | 12/1990 | Ewen |
| 5,017,714 | 5/1991 | Welborn |
| 5,036,034 | 7/1991 | Ewen |
| 5,120,867 | 6/1992 | Welborn |
| 5,122,583 | 6/1992 | Ewen et al. |
| 5,132,262 | 7/1992 | Rieger et al. ............ 502/117 |
| 5,155,080 | 10/1992 | Elder et al. |
| 5,225,500 | 7/1993 | Elder et al. |
| 5,234,878 | 8/1993 | Tsutsui et al. ............ 502/117 |
| 5,296,434 | 3/1994 | Karl et al. ............ 502/103 |

OTHER PUBLICATIONS

Spaleck, W.; Antberg, M.; Rohrmann, J.; Winter, A.; Bachmann, B.; Kiprof, P.; Behm, J.; Herrmann, W. J.; *Angew. Chem. Int. Ed. Engl.*, 1992, 31, 1347.
Mallin, D. T.; Rausch, M. D.; Lin, Y. G.; Dong, S. H.; Chien, J. C. W., *J. Am. Chem. Soc.*, 1990, 112, 2030.
Jordan, R. F.; Dasher, W. E.; Echols, S. F., *J. Amer. Chem. Soc.*, 1986, 108, 1718.
Eisch, J. J.; Piotrowski, A. M.; Brownstein, S. K.; Gabe, E. J.; Lee, F. L., *J. Amer. Chem. Soc.*, 1985, 107, 7219.
Ewen, J. A.; Jones, R. L.: Razavi A.; Ferrara, J. D., *J. Amer. Chem. Soc.*, 1988, 110, 6255.
Ewen, J. A., *J. Amer. Chem. Soc.*, 1984, 106, 6356.
Marks, T. J., *Organometallics*, 1988, 7, 1828.
Skattebol, L., Tetrahedron Letters No. 53, pp. 4659–4662 (1969) and *Journal of Organic Chemistry* 29, 2951 (1964).
Marks, et al., in Yang, X.; Stern, C. L.; Marks, T. J.; *J. Am Chem. Soc.* 1991, 113, 3623.
Zambelli, A. et al., "Isotatic Polymerization of Propene: Homogeneous Catalysts Based on Group 4 Metallocenes Without Methylaluminoxane," *Macromolecules* 1989, 22, pp. 2186–2189.
Farina, M.; Di Silvestro, G.; Sozzani, P., *Macromolecules*, 1982, 15, 1451.
Besancon, J.; Top, S., *J. Organomet. Chem.*, 1977, 127, 139.
Ewen, J. A., "Ligand Effects On Metallocene Catalyzed Ziegler–Natta Polymerizations," pp. 271–292.
Coughlin, E. B.; Bercaw, J. E. *J. Amer. Chem. Soc.*, 1992, 114, 7606.
Hortmann, K.; Brintzinger, H. H., *New J. Chem.*, 1992, 16, 51.
Aggarwal, M.; Geanangel, R. A.; Ghuman, M. A., *Main Group Metal Chemistry*, 1991, 14, 263.
Halterman, R. L., *Chem. Rev.*, 1992, 92, 965.
Skatterbol, L. *Tetrahedron*, 1967, 23, 1107.
Ewen, J. A.; Elder M. J.: Jones, R. L.: Curtis S.; Cheng H. N., in *Catalytic Olefin Polymerization*; Keii, T.; Soga K.; Eds.; 23–25 Oct. 1989, Elsevier, New York, 1990, p. 439.
Ewen, J. A.; Elder, M. J.; Jones, R. L.; Haspeslagh, L.; Atwood, J. L.; Bott, S. G.; Robinson, K., *Makromol. Chem. Macromol. Symp.*, 1993, 49/49, 253.
Ewen, J. A.; Haspeslagh, K.; Elder, M. J.; Atwood, J.; Zhang, H.; Cheng, H. N., in *Olefin Polymerization*; Kaminsky, W.; Sinn, H.; Eds.; 21–24, Sep. 1987, Springer–Verlag, New York, 1988, p. 271.

*Primary Examiner*—Asok Pal

[57] ABSTRACT

Isospecific and/or syndiospecific catalysts and processes for the propagation or an isotactic and/or syndiotactic polymer chain derived from an ethylenically unsaturated monomer which contains 3 or more carbon atoms or is a substituted vinyl compound. The catalysts comprise a double-conformationally locked metallocene and/or metallocene cation catalysts, characterized by having sterically dissimilar substituents such that the catalysts have overall either $C_s$ or $C_2$ (or pseudo-$C_s$ or $C_2$) symmetrically distributed. Methods are also described for the preparation and use of these unique catalysts.

22 Claims, No Drawings

DOUBLY-CONFORMATIONALLY LOCKED, STEREORIGID CATALYSTS FOR THE PREPARATION OF TACTIOSPECIFIC POLYMERS

TECHNICAL FIELD

This invention relates to unique catalysts and processes using the unique catalyst for the production of isotactic and/or syndiotactic polymers which can be prepared essentially free of defects.

More particularly, the present invention relates to production of a isotactic and/or syndiotactic polyolefin by polymerization of ethylenically unsaturated olefins over a doubly conformationally locked metallocene catalyst having a metallocene ligand containing bridged cyclopentadienyl rings bearing substituents with different steric requirements (one being sterically larger than the other) and where the substituents impart either $C_s$, $C_2$, pseudo-$C_s$ or pseudo-$C_2$ symmetry to the metallocene ligand.

BACKGROUND OF THE INVENTION

Polyolefins can be prepared in a variety of configurations that correspond to the manner in which each new monomer unit is added to a growing polyolefin chain. Four basic configurations are commonly recognized for polyolefins: atactic hemi-isotactic, isotactic and syndiotactic. Of course, a given polymer may incorporate regions of each configuration type, yet not exhibit the pure or nearly pure configuration.

Atactic, polymers exhibit no regular order of repeat units in the polymer chain. i.e., the substituents neither alternate nor maintain the same orientation relative to a hypothetical plane containing the polymer backbone (the plane is oriented such that the substituents on the pseudo-asymmetric carbon atoms are either above or below the plane), but assume a random distribution of orientations. On the other hand, isotactic, syndiotactic, and hemi-isotactic polymers have unique and regularly repeating stereochemistries.

The isotactic structure is typically described as having the substituents attached to the pseudo-asymmetric carbon atoms, oriented on the same side relative to the plane containing the polymer backbone, i.e., the substituents are all either configured above or below the plane. Using the Fischer projection formula, the stereochemical sequence for a segment of an isotactic polymer is shown below:

Another way of describing the isotactic structure is through the use of NMR. In Bovey's NMR nomenclature, an isotactic pentad is represented by ... mmmm ... with each "m" representing a "meso" dyad or successive substituents on the same side in the plane. As is well known in the art, any inversion about a pseudo-asymmetric carbon in the chain will lower the degree of isotacticity and crystallinity of the polymer.

In contrast, the syndiotactic structure has the substituents, that are attached to the pseudo-asymmetric carbon atoms, pseudo-enantiomorphically disposed, i.e., the substituents are depicted as being oriented alternately and regularly above and below the main polymer chain. Using the Fischer projection formula, the stereochemical sequence for a segment of a syndiotactic polymer is shown below:

In NMR nomenclature, a syndiotactic pentad is represented by ... rrr ... in which each "r" represents a "racemic" dyad, i.e., successive methyl groups on alternate sides of the polymer backbone. The percentage of r dyads in the chain determines the degree of syndiotacticity of the polymer.

There are other variations in polymer structures as well. One such variant is the so-called hemi-isotactic polymers. Hemi-isotactic polymers are ones in which every other pseudo-asymmetric carbon atom has its substituent oriented on the same side relative to the plane containing the polymer backbone in the Fischer projection formulas. While, the other psuedo-asymmetric carbon atoms can have their substituents oriented randomly either above or below the plane. Since only every other pseudo-asymmetric carbon is in an isotactic configuration, the term hemi is applied. Using a Fischer projection formula, the stereo-chemical sequence for a hemi-isotactic polymer is shown below:

Isotactic and syndiotactic polymers are crystalline polymers and are insoluble in cold xylene. Crystallinity distinguishes both syndiotactic and isotactic polymers from hemi-isotactic or atactic polymers that are soluble in cold xylene and are non-crystalline. Atactic polymers are typically a waxy product and not crystalline. While it is possible for a catalyst to produce all four types of polymers (atactic, hemi-isotactic, isotactic and syndiotactic), it is desirable for a catalyst to produce predominantly or essentially exclusively isotactic or syndiotactic polymer with very little atactic polymer and few stereochemical defects.

Catalysts that produce isotactic polyolefins are disclosed in U.S. Pat. Nos. 4,794,096 and 4,975,403, as well as European Pat. Appln. 0,537,130. Catalysts that produce syndiotactic polyolefins are disclosed in U.S. Pat. Nos. 3,258,455, 3,305,538, 3,364,190, 4,852,851, 5,155,080, and 5,225,500. Cationic metallocene catalysts are disclosed in European Patent Applications 277,003 and 277,004. Catalysts that produce hemi-isotactic polyolefins are disclosed in U.S. Pat. No. 5.036,034.

Although the catalysts described in the patents listed above are capable of generating polymers that have a relatively high stereoselectivity to a given tacticity, all are subject to various phenomena that introduce defects in the stereoregularity of the polymers. One common defect in isotactic polymers is the occasional introduction of the opposite orientation, disrupting the isotactic placement of monomer units, as shown below:

On the other hand, an analogous defect in syndiotactic polymers (i.e., the occasional introduction of the reversed orientation) produces the meso triad defect, shown below:

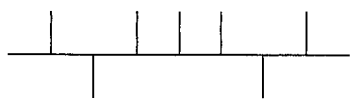

Thus, it would be a significant advancement in the art to be able to design and prepare stereospecific catalysts capable of generating stereoregular polymers essentially free of defects or where the amount and type of defects can be statistically controllable through catalyst design. Polypropylene with higher tactiospecificity will have a higher melting point and, therefore will be better suited for higher temperature applications such as the fabrication of ironable zippers for the clothing industry. Of course, other uses will be apparent as well.

SUMMARY OF THE INVENTION

The present invention provides isospecific and/or syndiospecific double-conformationally locked metallocene catalysts, processes for preparing the catalysts, and processes for preparing isotactic and/or syndiotactic polyolefins derived from polymerizing ethylenically unsaturated monomers containing three (3) or more carbon atoms using the double-conformationally locked catalysts.

The double-conformationally locked metallocene catalysts (sometimes referred to as doubly locked metallocene catalysts) incorporate a bridged cyclopentadienyl ring (sometimes abbreviated as Cp ring) ligand systems where each cyclopentadicnyl ring bears b or distal substituents, other than hydrogen, with different steric requirements (i.e., one substituent is sterically larger than the other) such that the resulting catalyst precursor has either $C_s$, $C_2$, pseudo-$C_s$, or pseudo-$C_2$ symmetry.

Catalysts or their precursor metallocenes in accordance with the present invention may be characterized by formula (I):

where: A is a structural bridge; Z and Z' are the same or different substituted cyclopentadienyl radicals having sterically different substituents at the b or distal ring carbon atoms (i.e., the 3 and 4 ring positions). The ring carbon is bonded to the structural bridging group A. The overall catalyst has either $C_s$, $C_2$, pseudo-$C_s$, or pseudo-$C_2$ symmetry; Me is a Group 3, 4, or 5 element from the Periodic Table of Elements; Q a hydrocarbyl radical or a halogen atom; P is a stable anion; k is an integer having a value from 1 to 3; and 1 is an integer having a value from 0 to 2.

The present invention further provides a process for producing isotactic and syndiotactic polyolefins comprising introducing at least one of the catalyst components of formula (I) into a polymerization reaction zone containing an ethylenically unsaturated monomer. In addition, a co-catalyst such as an alkyl aluminum or a aluminoxane is added into the reaction zone or combined with the metallocenes of formula (I) prior to introduction into the zone. For cationic catalysts of formula (I) (l=1 or 2), an ion-pair or a strong Lewis acid compound is reacted with the neutral metallocene (1=0) to form a cationic metallocene either prior to or concurrent with introduction in the zone.

Furthermore, the catalyst components of formula (I) may be made into pre-polymerized catalytic systems prior to introduction into the reaction zone and/or prior to the stabilization of the reaction conditions in the zone. Moreover, the present invention can also be practiced to produce intimate blends of isotactic and syndiotactic polymers by introducing a catalyst of formula (I) designed for each tacticily into the reaction zone. The preferred application of the invention is in the production of isotactic polypropylene, syndiotactic polypropylene or mixtures thereof.

The present invention also includes processes for preparing the doubly stereolocked metallocene ligand systems, methods for preparing the catalysts of formula (I) and methods for activating the catalysts of formula (I) into catalytically active polymerization agents.

DETAILED DESCRIPTION

The inventor has found that catalysts can be prepared which have improved stereospecificity in the preparation of isotactic and syndiotactic polyolefins relative to prior art analogs. These uniquely designed catalysts have as a key feature a bridged substituted cyclopentadienyl ligand system that stereolocks the resulting metallocene catalyst in a chain conformation where the degree of stereoselectivity can be controlled to yield isotactic and syndiotactic polymers with essentially no defects compared to prior art catalyst systems. The substituents are selected such that one of the substituents on each ring is sterically different from the other and the substituents are situated on the carbon atoms b or distal to the carbon atom bonded to the bridging group and such that the overall ligand has either $C_s$, $C_2$, pseudo-$C_s$, or pseudo-$C_2$ symmetry.

The inventor has also found that by controlling the substituents relative steric size, catalysts can be formed that insert statistically controllable defects into the resulting polymers. The inventor has also found that catalysts of the present invention can be designed to produce hemi-isotactic polymers with little or no defects in the isotactic part. The inventor has also found that intimate mixtures of essentially pure isotactic and/or syndiotactic polymers with less stereoregular polymers can be prepared by polymerizing monomer in the presence of the tactiospecific catalysts of the present invention in combination with less tactiospecific catalysts of the present invention and/or prior art catalysts.

The present invention involves the use of certain double-conformationally locked, stereorigid metallocenes as catalysts for preparing isotactic polymers, syndiotactic polymers or intimate mixtures thereof. Of course, one skilled in the art should recognize that the metallocenes catalysts of formula (I) typically represent precursors to the actual catalytically active species that ultimately polymerizes the olefinic monomers. Typically, the metallocene catalysts of formula (I) are combined with co-catalysts to provide a usable catalytically active agent.

The term metallocene, in accordance with normal art usage, denotes an organometallic coordination compound in which two cyclopentadienyl containing ligands are bonded to or "sandwiched" about a central metal atom. The metal atom may be a transition metal or transition metal halide, alkyl alkoxy, halide or the like. Such structures are sometimes referred to as "molecular sandwiches" since the cyclopentadienyl ligands are oriented above and below the plane containing the central coordinated metal atom. Similarly, the term "cationic metallocene" means a metallocene in which the central coordinated metal atom carries a positive charge, i.e., the metallocene complex is a cation associated with a stable non-coordinating or pseudo-non-coordinating anion.

The metallocenes used in the present invention are stereorigid and doubly stereolocked, i.e., the chain-end is locked conformationally by two sterically different b-substituents. Stereorigidity is imparted to the metallocene ligand by a chemical bridge connecting the cyclopentadienyl rings. The bridging group prevents the cyclopentadienyl rings from undergoing structural isomerization.

In contrast to the prior art, the metallocene catalysts of the present invention must not only be stereorigid, but each cyclopentadienyl (sometimes abbreviated Cp) ring must be capable of conformationally locking the chain-end by the presence of substituents attached to each Cp ring and that impart either $C_s$, $C_2$, pseudo-$C_s$, or pseudo-$C_2$ symmetry to the overall metallocene ligand.

The stereorigid and double-conformationally locked metallocene catalysts employed in the present invention may be characterized by formula (I):

(I)

where A, Z, Z', Me, Q, P, k and l are as previously defined.

Of course, one skilled in the art should also recognize that the permissible values for k and l will depend on the actual ligand system and on the coordinating metal and the values of k and l are understood to conform to known organometallic structural and electronic requirements.

Suitable structural bridging groups A that impart stereorigidity to the metallocene catalysts of formula (I) include, without limitation, a C1–C20 alkenyl radical, a peralkylated C1–C20 alkenyl radical, a dialkyl methyl radical, a C3–C12 cyclohydrocarbyl radical, an aryl radical, a diarylmethyl radical, a diaryl allyl radical, a silicon hydrocarbyl radical, dihydrocarbyl silenyl radicals, a germanium hydrocarbyl radical, a phosphorous hydrocarbyl radical, a nitrogen hydrocarbyl radical, a boron hydrocarbyl radical, an aluminum hydrocarbyl radical, and the like.

Other suitable bridging groups include ionic units such as $B(C_6F_5)_2$, and $Al(C_6F_5)_2$, and the like and $R_2C$, $R_2Si$, $R_4Et$, $R_6Pr$, and the like where R can be any hydrocarbon, cyclic hydrocarbon, cyclic or linear hydrocarbons bearing another organometallic catalyst or carbonates, etc. Indeed, the bridges can be $C_2$ bridges (and $C_3$ etc.) which form the backbone of polymeric supports (e.g. the atactic, syndiotactic and isotactic polymers from vinyl-indene and 9-vinylfluorene etc.) as well as functionalized polystyrene precursors and all other polymers with terminal or branched boron or Al functional groups which are bonded to the catalysts, e.g., in zwitterionic form. $R_2C$ and $R_2Si$ bridging groups are preferred with isopropylidene and dimethylsilenyl bridging groups being particularly preferred.

Suitable Z and Z' radicals include substituted Cp rings of formula (a):

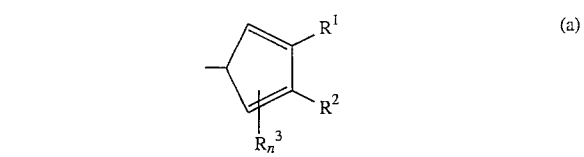

substituted indenyl rings of formula (b):

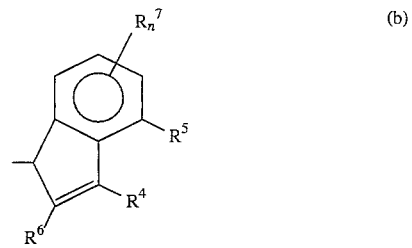

and substituted fluorenyl rings of formula (c):

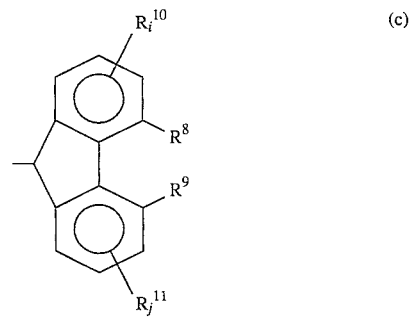

where: $R^1$ and $R^2$ are the same or different radicals other than hydrogen, $R^3$ is any radical and m is an integer having a value from 0 to 2; $R^4$ is a radical other than hydrogen and $R^5$, $R^6$ and $R^7$ are independently any radical and n is an integer having a value from 0 to 3; and $R^8$ and $R^9$ are the same or different radicals, $R^{10}$ and $R^{11}$ are independently any radical, and i and j are integers having values from 0 to 3.

Suitable radicals corresponding to $R^1$, $R^2$, and $R^4$ include, without limitation, a linear or branched C2–C20 hydrocarbyl radical, a linear or branched C2–C20 halocarbyl radical, a C2–C20 hydrohalocarbyl radicals, a linear or branched C2–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorous hydrocarbyl radical, a nitrogen hydrocarbyl radical, a boron hydrocarbyl radical, an aluminum hydrocarbyl radical, a halogen atom, and the like. Preferable, non-hydrogen radicals include linear or branched C2–C20 alkyl radicals with ethyl, isopropyl, and t-butyl radicals being particularly preferred.

Zwitterionic radicals such as $Cp$—$B(C_6F_5)_3^-$, $Cp$—$Al(C_6F_5)_3^-$, $Cp$—$Al(CF_3)_3^-$, $Cp$—$B(CF_3)_3^-$, $Cp$—$X$—$Al(C_6F_5)_3^-$, $Cp$—$X$—$B(C_6F_5)_3^-$, and the like are also suitable radicals, where X can represent an alkenyl group, alkenoxy group or the like. Metallocenes of formula (I) containing zwitterionic radicals on either the Z or Z' rings and incorporating a group 4 metal for Me would not need an independent and sometimes stereochemically interfering counterion (i.e., l=0). These zwitterionic radicals may also be suitable for mono and di cations of catalysts of formula (I) where Me is a group 5 metal in the plus five oxidation state (Me(V)). They could even conceivably be used to create ion-pair catalysts with the normally neutral group 3 metals in the plus three oxidation state (Me(III)). In this case, one could obtain heterogeneous insoluble ion-pair systems for improved polymer particle size and morphology control.

Suitable radicals corresponding to $R^8$ and $R^9$ include, without limitation, a hydrogen atom, a linear or branched C1–C20 hydrocarbyl radical, a linear or branched C1–C20 halocarbyl radical, a linear or branched C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an arylalkyl radical, an alkylaryl radical, a silicon hydrocarbyl radical, a germanium hydrocarbyl radical, a phosphorous hydrocarbyl radical, a nitrogen hydrocarbyl radical, a boron hydrocarbyl radical, an aluminum hydrocarbyl radical, a halogen atom, and the like.

Suitable organic radicals corresponding to $R^3$, $R^6$, $R^7$, $R^{10}$, and $R^{11}$ include, without limitation, a hydrogen atom, a linear or branched C1–C20 hydrocarbyl radicals, a linear or branched C1–C20 halocarbyl radical, a linear or branched C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an arylalkyl radical, an alkylaryl radical, a silicon hydrocarbyl radical, a germanium hydrocarbyl radical, a phosphorous hydrocarbyl radical, a nitrogen hydrocarbyl radical, a boron hydrocarbyl radical, an aluminum hydrocarbyl radical, a halogen atom, and the like.

Suitable metals corresponding to Me include, without limitation, Group 3, 4, 5 from the Periodic Table of Elements. Preferably, Me is a Group 4 or 5 metal and more preferably a Group 4 metal, and specifically titanium, zirconlure or hafnium.

Suitable hydrocarbyl radical or halogen corresponding to Q include, without limitation, a linear or branched C1–C20 alkyl radical, as aryl radical, an alkylaryl radical, an arylalkyl radical, a F atom, a Cl atom, a Br atom, and an I atom.

Suitable non-coordinating anions corresponding to P in formula (I) include, without limitation, [BF$_4$]–, B(PhF$_5$)–$_4$, [W(PhF$_5$)$_6$]–, [Mo(PhF$_5$)$_6$ ]–(wherein PhF$_5$ is pentafluorophenyl), [ClO$_4$]–, [S$_n$O$_6$]–, [PF$_6$]–, [SbR$_6$]–, [AlR$_4$]–(wherein each R is independently, Cl, a C1–C5 alkyl group preferably a methyl group, an aryl group, e.g. a phenyl or substituted phenyl group, or a fluorinated aryl and alkyl group). For a further description of compatible non-coordinating anions and their associated cations which may be employed in the present invention, reference is made to European applications 277,003 and 277,004 incorporated herein by reference.

Q is a previously defined, but preferably, Q is a methyl or halogen, and more particularly a chlorine atom.

Z and Z' are substituted in such a way that the resulting metallocene will have either $C_2$, $C_s$, pseudo-$C_2$ or pseudo-$C_s$ symmetry. Thus, syndiospecific catalysts and/or catalyst precursors will result from ligands having the two sterically larger b or distal substituents on the same Cp ring and the two smaller b or distal substituents on the other ring. Isotactic catalysts and/or catalyst precursors can result from ligands having a large and a small b or distal substituent on each Cp ring.

A few exemplified examples of metallocene ligands (AZZ'), that generate catalysts with higher isotactic selectivity than the prior art, include, without limitation, rac-methylene(bis(3-methyl-4-t-butyl-1-Cyclopentadienyl), rac-ethylene(bis(3-methyl-4-t-butyl-1-cyclopentaxdienyl), rac-isopropylidene(bis(3-methyl-4-t-butyl-1-cyclopentadienyl), rac-dimethylsilenyl(bis(3-methyl-4-t-butyl-1-cyclopentadienyl), rac-methylene(bis(3-t-butyl-1-indenyl)), rac-ethylene(bis( 3-t-butyl-1-indenyl)), rac-isopropylidene(bis(3-t-butyl idenyl)), rac-dimethylsilenyl(bis(3-t-butyl-1-indenyl)), rac-methylene(bis( 4-t-butyl-9-fluorenyl)), rac-ethylene-(bis(4-butyl-9-fluorenyl)), rac-isopropylidene(bis(4-t-butyl-9-fluorenyl)), rac-dimethylsilenyl(bis(4-t-butyl-9-fluorenyl)), and the like.

A few exemplified examples of metallocene ligands (AZZ'), that generate catalysts with varying, but controllable degrees of isotactic selectivity, include, without limitation, rac-methylene(3-methyl-4-t-butyl-1-cyclopentadienyl)(3-t-butyl-1-indenyl), rac-ethylene(3-methyl-4-t-butyl-1-cyclopentadienyl)(3-t-butyl-1-indenyl), rac-isopropylidene(3-methyl-4-t-butyl-1-cyclopentadienyl)(3-t-butyl indenyl), rac-dimethylsilenyl(3-methyl-4-t-butyl-1-cyclopentadienyl)(3-t-butyl-1-indenyl), rac-methylene(3-t-butyl-1-indenyl)(5-t-butyl-9-fluorenyl), rac-ethylene(3-t-butyl-1-indenyl)(4-t-butyl-9-fluorenyl), rac-isopropylidene(3-t-butyl-1-indenyl)(4-t-butyl-9-fluorenyl), rac-dimethylsilenyl (3-t-butyl-1-indenyl)(4-t-butyl-9-fluorenyl), rac-methylene(3-methyl-4-t-butyl-1-cyclopentadienyl)(4-t-butyl-9-fluorenyl), rac-ethylene(3-methyl-4-t-butyl cyclopentadienyl)(4-t-butyl-9-fluorenyl), rac-isopropylidene(3-methyl-4-t-butyl-1-cyclopentadienyl)(4-t-butyl-9-fluorenyl), rac-dimethylsilenyl(3-methyl-4-t-butyl-1-cyclopentadienyl)(4-t-butyl-9-fluorenyl), and the like.

A few exemplified examples of metallocene ligands (AZZ'), that generate catalyst with higher syndiotactic selectivity than the prior art, include, without limitation, methylene(3,4-dimethyl-1-cyclopentadienyl)(3',4'-di-t-butyl-1'-cyclopentadienyl) ethylene(3,4-dimethyl cyclopentadienyl)(3',4'-di-t-butyl-1'-cyclopentadienyl), isopropylidene(3,4-dimethyl-1-cyclopentadienyl)(3',4'-di-t-butyl-1'-cyclopentadienyl), dimethylsilenyl(3,4-dimethyl-1-cyclopentadienyl)(3',4'-di-t-butyl-1'-cyclopentadienyl) methylene(4,5-di-t-butyl-9-fluorenyl)(9-fluorenyl), ethylene(4,5-di-t-butyl-9-fluorenyl)(9-fluorenyl), isopropylidene(4,5-di-t-butyl-9-fluorenyl)(9-fluorenyl), dimethylsilenyl(4,5-di-t-butyl-9-fluorenyl)(9-fluorenyl), and the like.

The unique and novel feature of the catalysts of the present invention that the catalysts are both stereorigid and double-conformationally locked. These two characteristics cause the polymers generated using these catalysts to have near 100% stereoregularity. The catalyst can be designed by controlling the b substituents to virtually eliminate the introduction of the wrong p face coordination or orientation during monomer insertion and chain propagation. Thus, the bridging group A imparts the stereorigidity to the catalysts of formula (I), while the b-substituents double-conformationally lock the chain end attached to the catalysts and/or catalyst precursors of formula (I) by concertedly controlling the stereochemistry of addition of each monomer unit to the growing chain.

It is reasonably supposed from the prior art that the relative stereospecificities, though higher than previously available with other metallocene analogs, can be tailored with a number of strategies. The single carbon bridged versions have been more stereospecific than the silicon bridged analogs for syndiotactic specific catalysts; the carbon bridged versions are generally less stereospecific than the silicon bridged analogs for isospecific catalysts. The larger the steric requirements are for the b-substituents, the more stereospecific the catalyst is. The difference in the steric requirements for the conformational locks and the stereo-controlling b-substituent can be used to optimize the orientation of the chain end.

The present invention is directed to both neutral metallocene and cationic metallocene catalysts and catalyst precursors as evidenced by the subscript l associated with the anion P having permissible values of 0 to 2, i.e., when l=0, the catalysts are neutral and when l=1 or 2 the catalysts are cationic as evidenced by the inclusion of an anion is formula (I).

The catalysts of the present invention are either isospecific and/or syndiospecific and produce polymers with very high tacticity indices depending on the desired tacticity.

In order to produce the tactically specific catalysts and/or catalyst precursors of the present invention, the characteristics of the b-substituents on the bridged cyclopentadienyl rings are important. Thus, the "steric requirement" or "steric size" of the b-substituents is designed to control the steric characteristics of catalyst or catalyst precursor such that the overall ligand system has $C_2$ or $C_s$ or pseudo-$C_2$ or pseudo-$C_s$ symmetry. The very specific arrangement of the b-substituents allows these unique catalysts to control the stereochemistries of each successive monomer addition.

Preferably, the syndiospecific metallocene catalysts of the present invention exhibit overall $C_s$ or pseudo-$C_s$ symmetry of the metallocene catalysts relative to a plane bisecting the bridged cyclopentadienyl rings while the isospecific metallocene catalysts of the present invention exhibit overall $C_2$ or pseudo-$C_2$ symmetry.

The term $C_s$ or pseudo-$C_s$ symmetry means that each pair of sterically similar b-substituents on the same Cp ring, while the term $C_2$ or pseudo-$C_2$ symmetry means that each Cp ring has sterically different b-substituents. For example, the isopropylidene bis(3-methyl, 4-t-butyl Cp) ligand would generate rac isospecific catalysts with $C_2$ or pseudo-$C_2$ symmetry (the meso isomer yields atactic polymer and can be separated from the rac catalyst by crystallization or other separation techniques well known in the art), while the isopropylidene (3,4-di-t-butyl Cp) (3,4-dimethyl Cp) ligand would generate a syndiospecific catalyst with $C_s$ or pseudo-$C_s$ symmetry.

One preferred subclass of the catalysts of formula (I) are catalysts of formula (II) which are derived from a bridged bis(3,4-di-substituted cyclopentadienyl) ligand system and are shown below:

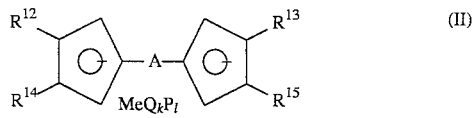

where A, Me, Q, P, l and k are as previously defined and $R^{12}$–$R^{15}$ are of radicals analogous to $R^1$ and $R^2$. Again the unique attribute of the catalysts of formula (II) is the presence of the sterically dissimilar b-substituents of the Cp rings. When $R^{12}$ and $R^{14}$ are sterically larger than $R^{13}$ and $R^{15}$ the catalyst will have $C_s$ or pseudo-$C_s$ symmetry and be syndiospecific. When $R^{12}$ and $R^{15}$ are the sterically larger than $R^{14}$ and $R^{13}$, then the catalyst will have $C_2$ or pseudo-$C_2$ symmetry and be isospecific. The preferred catalyst of formula (II) will have only two different b-substituents, e.g., two methyl and two t-butyl groups.

Another, preferred subclass of the catalysts of formula (I) are catalysts of formula (III) which are derived from a bridged bis(3-substituted indenyl) ligand system and are shown below:

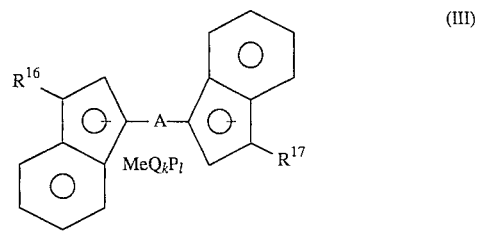

where A, Me, Q, P, k, and l are as previously defined and $R^{16}$ and $R^{17}$ are analogous to $R^4$. Again the unique attribute of the catalysts of formula (III) is the presence of the sterically dissimilar b-substituents on the Cp rings of the indenyl groups, i.e., $R^{16}$ and the aromatic carbon of the benzene ring in the other b or distal position or $R^{17}$ and the aromatic carbon of the benzene ring in the other b or distal position. It should be recognized to ordinary artisans that these catalysts are designed primarily for isospecific polymers.

Still another, preferred subclass of the catalysts of formula (I) are catalysts of formula (IV) which are derived from a bridged bis(4,5-di-substituted fluorenyl) ligand system and are shown below:

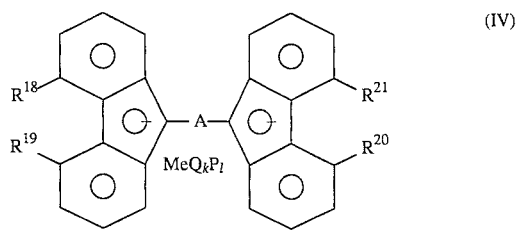

where A, Me, Q, P, k, l, are as previously defined and $R^{18}$–$R^{21}$ are analogous to $R^8$ and $R^9$. Again the unique attribute of the catalysts of formula (IV) is the presence of the sterically dissimilar substituents at the 4 and 5 positions of the fluorene rings. When the resulting catalyst have $C_2$ or pseudo-$C_2$ symmetry, the catalyst is isospecific, while the catalyst is syndiospecific when it has $C_s$ or pseudo-$C_s$ symmetry. For purposes of naming and numbering, Applicant has used the numbering system found in "The Hand Book of Chemistry & Physics", 57th ed. was used.

It may also be possible to strategically arrange substituents with the proper steric properties on an appropriate carbon(s) of the flourene ring(s) of, e.g., $R_2Si$ and Et bridged bisfluorenyl complexes, which should serve as chain end conformational locks (preferably positioned in the mouth of the Flu ligand) and which could also confer solubility (ion pair separation for better catalyst activity and stereospecificity) and/or insolubility (for better control of polymer morphology); as desired. The bridged, substituted bisfluorenyl complexes are stereorigid, provide chain-end conformational locks, and are superior to those without such conformational locks. The high basicily of the fluorenyl ligands provide Zr and other metals in metallocene catalysts with higher molecular weight products than mono-Flu, Cp, and Ind bearing catalysts.

Prior art has shown, for example, that a methyl substituent positioned at the a-Cp position on the C5 ring of bisindenyl catalysts increases the molecular weight of isotactic polypropylene produced with the Et[Ind]$_2$ZrCl$_2$ based catalyst. Similarly, a methyl substituent on the C6 ring of the indenyl ring system has reduced the stereospecificity or increased the catalyst activity depending on the positional isomerism. These effects can be reasonably expected to carry over to the catalyst system of the present invention.

Also, the addition of methyl, t-Bu, OMe, Ph, etc. substituents to the Flu C6 ring and to the Cp-bridging elements have had steric, solubility, and electronic influences on catalysts in syndio-and iso-tactic specific polymerizations. These effects are likewise expected to be carried over to metallocenes of the present invention and to their mixtures with other catalysts. Similarly the effects of substituting Al for B in the anions and the differences between carboranes and methylaluminoxanes and other counter anions are reasonably expected to be carried over to the new catalyst systems described herein.

One of ordinary skill in the art should recognize that the overall symmetry or pseudo-symmetry of the catalyst of formula (II) and formula (I) for that matter controls the tacticity of the resulting polymer. Catalysts with $C_2$ or pseudo-$C_2$ symmetry give rise to isospecific polyolefins, while syndiospecific catalysts are represented by those catalysts of formula (I) or (II) that have either $C_s$ or pseudo-$C_s$ symmetry.

By making the sterically larger b-substituents different and/or the sterically smaller b-substituents different, the catalysts of the present invention can be designed to impart any degree of tacticity to the resulting polymers. Thus, if one b-substituent is t-butyl and another is ethyl, and the other two are methyls, the tactiospecificity of the catalyst system will be reduced relative to the one having two t-butyls and two methyls.

Again all the catalyst of formulas (I–IV) share the same attributes, each is required to have sterically different b-substituents such that the overall symmetry of the ligand system is either $C_2$ or $C_s$ or pseudo-$C_2$ or pseudo-$C_s$ symmetry.

The concept of substituents with different steric requirements, size or bulk is well known in the art. However, to ensure that ordinary artisans understand its usage in the context of this invention, a non-exhaustive and illustrative list of the relative steric bulk of a variety of substituents can be found in Stoughtan and Adams article in J. Am. Chem. Soc., 54, 4426 (1936) and Yuan and Adams article in J. Am. Chem. Soc., 54, 4434 (1936)

Of course, cationic metallocene catalysts and catalyst precursors require the anion P to maintain net neutrality. The anion indicated by P in formula (I) is preferentially a compatible non-coordinating anion that either does not coordinate with the metallocene cation or is only weakly coordinated to the cation to remain sufficiently labile so that it can be readily displaced by a neutral Lewis base such as a monomer unit. Compatible non-coordinating anions are described as anions that stabilize the cationic metallocene catalyst systems, but do not transfer an anionic substituent or fragment to the cation to form a neutral metallocene and a neutral byproduct of the non-coordinately anion.

The useful size of the counterion P will also depend on the bulkiness or steric requirements of the substituent groups on the cyclopentadienyl rings. In addition to size, it is also thought that other characteristics are important for good anionic counterions. Such characteristics include stability and bonding. The anion must be sufficiently stable so that it cannot be rendered neutral by virtue of the metallocene cation extracting an electron. The bond strength with the cation is such that it does not interfere with monomer coordination and chain propagation.

A preferred procedure for producing cationic metallocene catalyst of the present invention (l=1 or 2) involves the reaction of an ion pair compound in a non-coordinating solvent with a stereorigid/double-conformational lock metallocene of formula (I) where l=0. Thus, triphenylcarbenium tetrakis(pentafluorophenyl) boronate may be reacted with a neutral metallocene of the present invention in a solvent such as toluene to generate a cationic metallocene of the present invention. This preparation method was disclosed in U.S. patent application Ser. No. 419,046 to John A. Ewen and Michael J. Elder entitled "Preparation of Metallocene Catalysts for Polymerization of Olefins" filed on Apr. 24, 1992 and now abandoned and referenced in U.S. Pat. No. 5,225,550, the entire disclosure of which is incorporated by reference.

Without intending to limit the scope of the present invention, it is believed that the overall $C_s$ or pseudo-$C_s$ symmetry of the catalysts results in the alternating configuration characteristic of syndiotactic polymers. This stereospecific control may be contrasted to the chain-end control of the catalysts disclosed by Natta et al.

A preferred application of the present invention is in the polymerization of C3+ alpha olefins, specifically propylene, into isotactic, syndiotactic, hemi-isotactic polymers or mixtures thereof. However, the invention may be employed in the preparation of hemi-isotactic, isotactic or syndiotactic polymers derived from other ethylenically unsaturated monomers. For example, syndiospecific, isospecific or hemi-isotactic specific propagation of a polymer chain from 1-butene may be carried out in accordance with the invention.

Ethylenically unsaturated monomers suitable for use in this invention include, without limitation, any organic molecule having a terminal vinyl group ($CH_2=CH-$) such as: a-olefins including propylene, 1-butene, 1-pentene, 1-hexene, 4-methyl-1-pentene and the like; vinyl halides including vinyl fluoride, vinyl chloride, and the like; vinyl arenes including styrene, alkylated styrenes, halogenated styrenes, haloalkylated styrenes and the like; dienes such as 1,3-butadiene and isoprene (i.e., 1,2-addition). Polypropylene is probably of the greatest practical significance and the invention will be described in detail with reference to the production of polypropylene polymers of different tacticities. However, other polymers in which polymers having a desired tacticity are also of interest.

The polymerization procedures disclosed in U.S. Pat. No. 4,892,851, may be also employed in carrying out the methods of the present invention and is incorporated herein by reference. Co-catalysts, usually organo-aluminum compounds such as trialkylaluminum, trialkyloxyaluminum, dialkylaluminum halides or alkylaluminum dihalides may be employed in the present invention. Especially suitable alkylaluminums are trimethylaluminum and triethylaluminum with the latter, commonly referred to as TEAL, being most preferred. Methylaluminoxane (MAO) are also usable in carrying out the methods of the present invention especially for neutral metallocene catalyst precursors. MAO may be used as a co-catalyst with metallocene catalysts in amounts well in excess of the stoichiometric equivalent amount providing mole ratios of aluminum to the coordinating metal (Me) of about 100–1000.

While the applicant's invention is not to be restricted by theory, it is believed that neutral metallocenes form cationic complexes by reaction with the MAO in the manner as disclosed by Zambelli, A. et al., "Isotactic Polymerization of Propene: Homogenous Catalysts Based on Group 4 Metallocenes Without Methylaluminoxane", Macromolecules 1989, 22, pages 2186–2189.

The catalyst precursors used in the present invention may be prepared by procedures similar to those disclosed in U.S. Pat. No. 4,892,851, while the active cationic catalysts may be produced by simply converting the neutral metallocene into the cationic state following procedures such as those disclosed in European applications 277,003 and 277,004 or by reaction with triphenylcarbenium boronate. Similarly, alcohol-B(PhF$_5$)$_3$ complexes can be used as anionic precursors for forming the active cationic metallocenes of the present invention where the alcoholic proton reacts with an alkyl group on the coordinating metal atoms to generate a cationic metallocene and an alkoxide-B(PhF$_5$)$_3$ anion. For additional information see, A. R. Siedle, W. M. Lammarra, R. A. Newmark, J. St. Werrs, D. E. Richardson, M. Ryan, Makroreal Chern, Marroonal Symp. 66, 215 (1993).

The chain-end conformational locking catalysts of formula (I) can also be converted to supported heterogeneous catalysts by depositing the catalysts on supports including, without limitation, silica, alumina, magnesium dichloride, polystyrene beads, and like. The supported analogs of the present catalyst can improve the bulk density of the polymer as further described in Canadian Pat. No. 2,027,145, U.S. Pat. Nos. 4,935,474 and 4,530,914 and European Appln. Nos. 0,427,697 and 0,426,638, incorporated herein by reference.

The catalyst can also be chemically linked to the support by placing functional groups with ion pairs or Lewis acid centers or Lewis base centers on the ligands and/or supports. Supporting can also be achieved by using large (oligomeric or polymeric) insoluble anions as counter ions.

The catalysts of the present invention can be used to prepare isospecific, syndiospecific, hemi-isospecific, and aspecific polymerizations, not only of propylene, but for all a-olefins such as 1-butene, 1-pentene, 1-hexene, 4-methyl-1-pentene, CH$_2$=CH(CH$_2$)$_p$Si(CH$_3$)$_3$ where p is 1 to 4, and the like.

One of ordinary skill should recognize that the ligands with one small and one large b-substituent on Z and Z' will result in meso and rac catalysts. The stereospecific rac catalysts can be separated from the meso form by crystallization. Perhaps we should also mention that it is well known from the Bercaw et al. work in the prior art that rac-metallocenes free of the undesirable aspecific meso stereoisomers can be prepared by placing suitable bulky substituents such as Si(Me)$_3$ on the Cp carbon atom proximal to (a to) the bridgehead carbon.

The catalysts of the present invention can obviously be used in conjunction with each other, all other metallocene catalysts, TiCl$_3$/DEAC, and or TiCl$_4$/MgCl$_2$/TEAL catalysts having internal electron donors such as diisobutylypthalate and external donors such as diphenyldimethoxysllane, methanol, etc. to produce polymers with mixed stereochemical compositions, distributions or tailored molecular weight distributions. Reactor blends of polymers with optimized physical, thermal, mechanical, and theological properties can be tailored to produce the optimum mixture for specific applications requiring high melt strength, high clarity, high impact strength, and high rates of crystallization, simply by mixing catalyst species together in appropriate ratios.

The catalysts of the present invention clearly have the potential to influence the rate of termination by b-hydride elimination reactions. This, therefore, provides a novel ligand effect for controlling polymer molecular weights. These catalysts can be exploited to tailor molecular weights and hence molecular weight distributions with mixed species of the catalysts and any other class of catalysts. This would be advantageous in tailoring the polymer properties in HDPE, LLDPE, i-PP, s-PP, etc. Similarly the chain-end conformation locking substituent will influence the rate of reactivity of the new metallocenes with a-olefins such as propylene, butene and hexene. The new ligand effects on the catalyst reactivity ratios can be exploited to produce reactor blends with varying compositions, sequences, distributions and/or molecular weight distributions. Similarly, the catalysts can reasonably be expected to provide improved tailored grades of polypropylene and propylene-ethylene high impact copolymers as reactor blends or from reactors in series including fluidized and stirred gas phase polymerizations.

The catalysts of the present invention can also be used to generate copolymers of olefins and copolymers of olefins and dienes with varying degrees of tactiospecificity.

The generalized methods that follow describe the preparation of the catalyst and/or catalyst precursors with the second method being preferred as it produces a more stable and active catalyst. It is important that the catalyst complex be "pure" as usually low molecular weight, amorphous polymer is produced by impure catalysts.

Generally, the preparation of the metallocene complex consists of forming and isolating the bridged bis Cp containing ring ligands which are then (aromatized and) reacted with a halogenated metal to form the complex.

The synthesis procedures are generally performed under an inert gas atmosphere using a glove box or Schlenk techniques. The synthesis process generally comprises the steps of 1) preparing the halogenated or alkylated metal compound, 2) preparing the ligand, 3) synthesizing the complex, and 4) purifying the complex.

The synthesis of the b-substituted ligands of the present invention can be accomplished by contacting an appropriately substituted fulvene with an appropriately substituted cyclopentadienyl containing anion ring under reaction conditions sufficient to produce a bridged structure having the requisite b-substituents on the Cp rings to yield ligands with either C$_2$ or C$_s$ or pseudo C$_2$ or pseudo C$_s$ symmetry.

Fulvene is cyclopentadiene with an exo-cyclic methylene group at the 1 position of cyclopentadiene ring. The exocyclic methylene carbon is the 6 position of fulvene. Since this carbon will ultimately become the bridging group A in formula (I), the preferred fulvenes for the preparation of the present catalysts are typically 6,6-disubstituted fulvenes so that the resulting bridging group is a tertiary carbon atom.

The fulvenes useful in preparing the ligands of the present invention have substituents in the 3 and 4 positions and are generally 6,6 disubstituted, while the other sites can be substituted or unsubstituted as shown below:

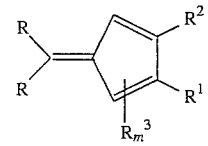

where R$^1$, R$^2$ and R$^3$ are as previously described and where R groups and the exocyclic carbon (C6 in fulvene) is meant to be the precursor to the structural bridging group A.

As noted previously, a preferred mode of converting the neutral metallocenes to cationic metallocene catalyst useful in the present invention involves reaction of the neutral metallocenes with a triphenylcarbenium boronate. A preferred reactant is triphenylcarbenium tetrakis (pentafluorophenyl) boronate.

The catalysts of the present invention can also be made into efficient pre-polymerized catalysts by the methods disclosed in U.S. Pat. Nos. 3,893,989, 4,200, 171, 4,287, 328, 4,316,966 and 5,122,583 incorporated herein by reference. Essentially, the catalysts are used to polymerize monomer on a small scale. The pre-polymerized catalysts can be prepared in the presence of co-catalysts such as the ones described previously and optionally in the presence of various electron donors.

The pre-polymerized catalysts can then be introduced into a reaction zone containing monomer. The resulting polymerization can show greatly improved catalytic efficiencies. The preferred methods for using pre-polymerized catalysts of the present invention are: (1) contacting a pre-polymerized catalyst of formula (I) with a co-catalyst and introducing the catalyst into a polymerization reaction zone containing monomer and (2) contacting a pre-polymerized catalyst of formula (I) with a co-catalyst and introducing the catalyst into a polymerization reaction zone containing monomer. Of course, the pre-polymerized catalysts of formula (I) can be introduced into the reaction zone in a stream either separately or in conjunction with separate streams containing the co-catalyst and/or electron donors.

Preferred pre-polymerized catalysts of the present invention have a weight ratio of polymer/catalyst of approximately 0.1–100 with ratios of less than 10 being particularly preferred.

The syntheses are conveniently done at room temperature or lower in low boiling solvents which are readily evaporated in vacuo.

A general scheme of preparing the catalyst of formula (I) is out lined below for the synthesis of $Me_2Si[3\text{-}t\text{-}Bu\text{-}Ind]_2ZrCl_2$ as a catalyst precursor where Me represents a methyl group in the following discussion and not the metal atom of formula (I). P 1,2-benzo-6,6-dimethylfulvene is prepared from the indenyl anion and acetone; as shown by Little et al in the Journal of Organic Chemistry. Reaction of 1,2-benzo-6,6-dimethylfulvene with one equivalent of methyl lithium in THF results in the Li salt of the 3-t-Bu-1,2-benzocyclopentadienyl anion. Addition of 0.5 equivalents of $Me_2SiCi_2$ in THF, followed by overnight stirring, results in $Me_2Si[3\text{-}t\text{-}Bu\text{-}Ind]_2$. The ligand precursor is isolated by extraction from LiCl with a suitable hydrocarbon solvent such as pentane, methylene chloride, or toluene, followed by solvent evaporation. The ligand dianion is obtained in THF from reaction of $Me_2Si[3\text{-}t\text{-}Bu\text{-}Ind]_2$ with 2 equivalents of methyl lithium. $Me_2Si[3\text{-}t\text{-}Bu\text{-}Ind]_2$ $Li_2.n(THF)$ mixtures with $ZrCl_4$ in pentane or cold methylene chloride yield meso-and rac-$Me_2Si[3\text{-}t\text{-}Bu\text{-}Ind]_2ZrCl_2$. The undesirable, nonstercospecific, meso stereoisomer can be separated from the rac form by fractional recrystallization from dichloromethane. This catalyst precursor can additionally be hydrogenated to the bis(tetrahydroindenyl) analog precursor.

Another example of a vic-disubstituted cyclopentadienyl derivative has been reported by Marks et al in Yang, X.; Stern, C. L.; Marks, T. J.; J. Am. Chem. Soc. 1991, 113, 3623, in which $[1,2\text{-}(CH_3)_2\text{-}Cp]_2ZrCH_3+$ is described. The $1,2\text{-}CH_3\text{-}Cp$ anion can be used to produce $R_2SiCl\text{-}[3,4\text{-}(CH_3)_2\text{-}1\text{-}Cp]$ as described earlier for other Cp ligands by Ewen et al. Reference: Makoomol. Chem., Macromol. Symp. 48/49, 253 (1991). For example, $R_2Si\text{-}[3,4\text{-}(CH_3)_2\text{-}1\text{-}Cp\text{-}9\text{-}Flu]ZrCl_2$ would be suitable catalyst precursors for producing higher molecular weight atactic polypropylene than obtainable with these catalyst before.

Similarly, $R_2Si[3,4\text{-}(CH_3)_2\text{-}1\text{-}Cp\text{-}3'\text{-}t\text{-}Bu\text{-}1'\text{-}Ind]ZrCl_2$ would give hemi-isotactic polypropylene with a higher iso-specificity for the stereoregular methine units than previously obtained.

Literature preparations for vic-dialkylcylopentadienes and their vic-dialkylcylopentadienes precursors in high yields are cited in H. O. House, "Modern Synthetic Reactions," 2nd Ed., W. A. Benjamin, Inc., Menlo Park, Calif., Reading, Mass., London, Amsterdam, Don Mills, Ontario, Sydney, pp. 642, 643, and 795, 1972.

Also L. Skatterbol at Union Carbide described the synthesis of gem (and otherwise) dialkyl cyclopentadienides and fulvenes in Tetrahedron, 1967, Vol. 23, pp. 1107 to 1117; Tetrahedron Letters No. 53, pp. 4659–4662 (1969) and the Journal of Organic Chemistry 29, 2951 (1964).

The following examples illustrate various bridged cationic metallocene catalysts used in producing polypropylene in accordance with the invention.

COMPARATIVE EXAMPLE 1

1.39 mg of rac-$Me_2Si[Ind]_2ZrCl_2$ is dissolved in 5 mL of 10-wt % MAO, cannulated into a 2 L stainless steel Zipperclave reactor containing 500 mL of toluene. Polymerization is initiated by adding 1,000 mL of propylene at 50° C. The contents are stirred at 500 rpm for 30 minutes to obtain 166 g of isotactic polypropylene with a dsc melting point of 144° C. and a viscosity average molecular weight of 52,000.

EXAMPLE 2

The same procedure as Example 1 is followed except that 5 mg of rac-$Me_2Si[3\text{-}t\text{-}Bu\text{-}Ind]_2ZrCl_2$ are used. The polymer analyses show a much higher dsc melting point and a higher molecular weight than obtained in Example 1.

EXAMPLE 3

The same procedure as Example 1 is followed at 80° C. except that 0.38 mg of rac-$Et[H_4Ind]_2ZrCl_2$ are used and the 500 mL of toluene are excluded. 469 gm of isotactic polypropylene are obtained with a viscosity average molecular weight of 7,000 and a very low dsc melting point.

EXAMPLE 4

The same procedure as Example 3 is followed except that 3 mg of rac-$Et[3\text{-}t\text{-}Bu\text{-}1\text{-}H_4Ind]_2ZrCl_2$ are used. The polymer analyses show an isotactic polymer with a much higher dsc melting point and a higher molecular weight than obtained in Example 3.

EXAMPLE 5

1.2 mg of $Me_2C[CpFlu]ZrCl_2$ is dissolved in 10 mL of 10-wt % MAO, cannulated into a 2 L stainless steel Zipperclave reactor. Polymerization is initiated by adding 1,200 mL of propylene and heating to 50° C. within 5 minutes. The contents are stirred at 500 rpm for 60 minutes to obtain syndiotactic polypropylene with a dsc melting point of 140° C., a viscosity average molecular weight of 133,000, and 2 mole-% meso triads as steric defects.

EXAMPLE 6

The same procedure as Example 5 is followed except that 3 mg of $Me_2C[3,4\text{-}di\text{-}t\text{-}Bu\text{-}CpFlu]ZrCl_2$ were used. The polymer analyses show a syndiotactic polymer with a lower mole-% of mm defects, a higher dsc melting point, and a higher molecular weight than obtained in Example 5.

While in accordance with the patent statutes, the best mode and preferred embodiments of the invention have been described, it is to be understood that the invention is not limited thereto, but rather is to be measured by the scope and spirit of the appended claims.

I claim:

1. A metallocene catalyst for preparing tactiospecific polyolefins comprising a bridged substituted cyclopentadienyl metallocene or a bridged substituted cyclopentadienyl metallocene cation having an associated stable weakly counterion characterized by formula (I):

where: A is a structural bridge; Z and Z' are the same or different substituted cyclopentadienyl radicals having sterically different, non-hydrogen substituents at both β or distal ring carbon atoms relative to the ring carbon bonded to the structural bridging group A and such that the when the sterically smaller distal substituents are on Z and the sterically larger distal substituents are on Z', the catalysts of formula (I) has $C_s$ or pseudo-$C_s$ symmetry and yields syndiotatic polyolefins and when Z and Z' both have on sterically smaller and one sterically larger substituent, the catalysts of formula (I) has $C_2$ or pseudo-$C_2$ symmetry and is a racemic mixture and yields isotactic polyolefins; Me is a Group 3, 4, or 5 metal from the Periodic Table of Elements; Q a hydrocarbyl radical or halogen atom; P is a stable non-coordinating anion; k is an integer having a value from 1 to 3; and 1 is an integer having a value from 0 to 2.

2. The catalyst of claim 1, wherein Me is titanium, zirconium or hafnium, Q is a methyl group, and k is 1.

3. The catalyst of claim 1, wherein Z and Z' are a cyclopentadienyl ring with a 3,4 substitution pattern, a fluorene ring with a 4,5 substitution pattern, and an indene ring with a 3 substitution pattern.

4. The catalyst of claim 1, wherein A is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical.

5. The catalyst of claim 4, wherein A is a C1–C20 alkenyl radical, a peralkylated C1–C20 alkenyl radical, a C3–C12 cyclohydrocarbyl radical, an aryl. radical, a diarylmethyl radical, a diaryl allyl radical, a silicon hydrocarbyl radical, dihydrocarbyl silenyl radicals, a germanium hydrocarbyl radical, a phosphorous hydrocarbyl radical, a nitrogen hydrocarbyl radical, a boron hydrocarbyl radical, an aluminum hydrocarbyl radical.

6. A metallocene catalyst for preparing tactiospecific polyolefins comprising a bridged, bis 3,4-di-substituted cyclopentadienyl metallocene or a bridged, bis 3,4-disubstituted cyclopentadienyl metallocene cation having an associated stable weakly coordinating counterion characterized by formula (II):

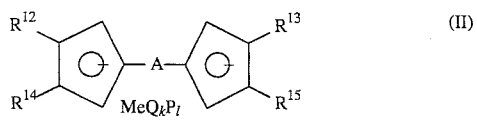

where $R^{12}$, $R^{13}$, $R^{14}$ and $R^{15}$ are radicals other than hydrogen such that two of the substituents are sterically larger than the other two and such that when $R^{12}$ and $R^{14}$ are the sterically smaller than $R^{13}$ and $R^{15}$, the catalysts of formula (II) has $C_s$ or pseudo-$C_s$ symmetry and $C_s$ and yields syndiotactic polyolefins and when $R^{12}$ and $R^{15}$ are the sterically smaller than $R^{13}$ and $R^{14}$, the catalysts of formula (II) has $C_2$ or pseudo-$C_2$ symmetry and yields isotactic polyolefins and where A is a structural bridge; Me is a Group 3, 4, or 5 metal from the Periodic Table of Elements; Q a hydrocarbyl radical or halogen atom; P is a stable weakly coordinating anion; k is an integer having a value from 1 to 3; and 1 is an integer having a value from 0 to 2.

7. A metallocene catalyst for preparing tactiospecific polyolefins comprising a bridged, bis(3-substituted)indenyl metallocene or a bridged, bis 3-substituted indenyl metallocene cation having an associated stable weakly coordinating counterion characterized by formula (III):

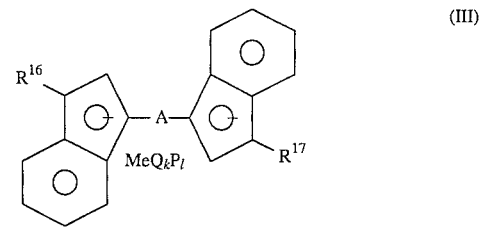

where $R^{16}$ and $R^{17}$ are radicals other than hydrogen such that the substituents are sterically larger than an aromatic carbon or methyl group and such that the catalysts of formula (III) have either $C_2$ or pseudo-$C_2$ symmetry and where A is a structural bridge; Me is a Group 3, 4, or 5 metal from the Periodic Table of Elements; Q a hydrocarbyl radical or halogen atom: P is a stable weakly coordinating anion; k is an integer having a value from 1 to 3; and 1 is an integer having a value from 0 to 2.

8. A metallocene catalyst for preparing tactiospecific polyolefins comprising a bridged, bis 4,5-di-substituted fluorenyl metallocene or a bridged, bis 4,5-di-substituted fluorenyl metallocene cation having an associated stable weakly coordinating counterion characterized by formula (IV):

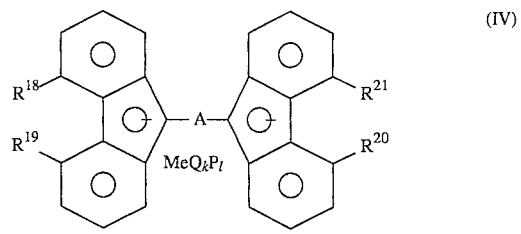

where $R^{18}$, $R^{19}$, $R^{20}$ and $R^{21}$ are radicals such that two of the substituents are sterically larger than the other two and such that when $R^{18}$ and $R^{19}$ are the sterically smaller than $R^{20}$ and $R^{21}$, the catalysts of formula (Iv) has $C_s$ or pseudo-$C_s$ symmetry and $C_s$ and yields syndiotactic polyolefins and when $R^{18}$ and $R^{20}$ are the sterically smaller than $R^{19}$ and $R^{21}$, the catalysts of formula (IV) has $C_2$ or pseudo-$C_2$ symmetry and yields isotactic polyolefins and where A is a structural bridge; Me is a Group 3, 4, or 5 metal from the Periodic Table of Elements; Q a hydrocarbyl radical or halogen atom; P is a stable weakly coordinating anion; k is an integer having a value from 1 to 3; and 1 is an integer having a value from 0 to 2.

9. A process for preparing tactic polymers derived from an ethylenically unsaturated monomer comprising the steps of:

a) providing a metallocene catalyst characterized by formula (I):

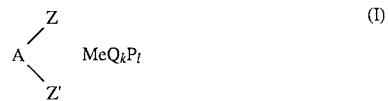

where: A is a structural bridge; Z and Z' are the same or different substituted cyclopentadienyl radicals having sterically different, non-hydrogen substituents at the β or distal ring carbon atoms relative to the ring carbon bonded to the structural bridging group A and such that when the sterically smaller distal substituents are on Z and the sterically larger distal substituents are on Z', the catalysts of formula (I) has $C_s$ or pseudo-$C_s$ symmetry and yields syndiotactic polyolefins and when Z and Z' both have one sterically smaller and one sterically larger substituent, the catalysts of formula (I) has $C_2$ or pseudo-$C_2$ symmetry and is a racemic mixture and yields isotactic polyolefins; Me is a Group 3, 4, and 5 metal from the Periodic Table of Elements; Q a hydrocarbyl radical or halogen atom; P is a stable weakly coordinating action; k is an integer having a value from 1 to 3; and l is an integer having a value from 0 to 2;

b) contacting the catalyst in a polymerization reaction zone with an ethylenically unsaturated monomer; and c) maintaining the reaction zone under polymerization conditions to produce tactiospecific polymerization of the monomer.

10. The process of claim 9, wherein Me is titanium, zirconium or hafnium, Q is a methyl group, and k is 1.

11. The method of claim 9, wherein said ethylenically unsaturated monomer is a C3+ hydrocarbon.

12. The method of claim 9, wherein said ethylenically unsaturated monomer is a substituted vinyl compound.

13. The method of claim 9, wherein said ethylenically unsaturated monomer is a C3+ alpha olefin or 4-methyl-1-pentene.

14. A process for the production of tactic polypropylene, comprising the steps of:

a) providing a metallocene catalyst characterized by formula (I)

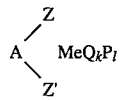
(I)

where: A is a structural bridge; Z and Z' are the same or different substituted cyclopentadienyl radicals having sterically different, non-hydrogen substituents at the β or distal ring carbon atoms relative to the ring carbon bonded to the structural bridging group A and such that when the sterically smaller distal substituents are on Z and the sterically larger distal substituents are on Z', the catalysts of formula (I) has $C_s$ or pseudo-$C_s$ symmetry and yields syndiotactic polyolefins and when Z and Z' both have one sterically smaller and one sterically larger substituent, the catalysts of formula (I) has $C_2$ or pseudo-$C_2$ symmetry and is a racemic mixture and yields isotactic polyolefins; Me is a Group 3, 4, and 5 metal from the Periodic Table of Elements; Q a hydrocarbyl radical or halogen atom; P is a stable weakly coordinating anion; k is an integer having a value from 1 to 3; and l is an integer having a value from 0 to 2;

b) contacting said catalyst with propylene is a polymerization reaction zone; and c) maintaining said reaction zone under polymerization reaction conditions to produce syndiotactic polypropylene.

15. The process of claim 14, wherein said polymerization reaction is carried out under conditions in which any aluminoxane concentration is maintained at a level providing an Al/Me mole ratio of no more than 10.

16. The method of claim 15, wherein said polymerization process is carried out in the absence of added aluminoxane.

17. The process of claim 14, wherein Me is titanium, zirconium or hafnium and, Q is a methyl group, and k is 1.

18. The process of claim 14, wherein Z and Z' are a 3,4-disubstituted cyclopendiene ring, a 3-substituted indene ring or a 4,5-disubstituted a fluorene ring.

19. The process of claim 14, wherein A is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical.

20. The process of claim 19, wherein A is a methyl, ethyl, isopropyl, cyclopropyl, dimethylsilyl, methylene, ethylene or isopropylidene radical.

21. A metallocene catalyst for preparing syndiospecific polyolefins comprising a bridged substituted cyclopentadienyl metallocene or a bridged substituted cyclopentadienyl metallocene cation having an associated stable weakly coordinating counterion characterized by formula (I):

(I)

where: A is a structural bridge; Z and Z' are the same or different substituted cyclopentadienyl radicals having sterically different substituents at the β or distal ring carbon atoms relative to the ring carbon bonded to the structural bridging group A and such that the distal substituents impart an overall $C_s$ or pseudo-$C_s$ symmetry to the catalyst and such that the catalyst generates syndiotactic polyolefins; Me is a Group 3, 4, or 5 metal from the Periodic Table of Elements; Q a hydrocarbyl radical or halogen atom; P is a stable weakly coordinating anion; k is an integer having a value from 1 to 3; and l is an integer having a value from 0 to 2.

22. A metallocene catalyst for preparing isospecific polyolefins comprising a bridged substituted cyclopentadienyl metallocene or a bridged substituted cyclopentadienyl metallocene cation having an associated stable weakly coordinating counterion characterized by formula (I):

(I)

where: A is a structural bridge; Z and Z' are the same or different substituted cyclopentadienyl radicals having sterically different substituents at the β or distal ring carbon atoms relative to the ring carbon bonded to the structural bridging group A and such that the distal substituents impart an overall C2 or pseudo-C2 symmetry to the catalyst and such that the catalyst generates isotactic polyolefins; Me is a Group 3, 4, or 5 metal from the Periodic Table of Elements; Q a hydrocarbyl radical or halogen atom; P is a stable weakly coordinating anion; k is an integer having a value from 1 to 3; and l is an integer having a value from 0 to 2.

* * * * *